United States Patent
Doetsch et al.

(10) Patent No.: US 9,698,898 B2
(45) Date of Patent: Jul. 4, 2017

(54) APPARATUSES, METHODS, AND COMPUTER PROGRAMS FOR A RECEIVER AND A TRANSMITTER OF A WIRELESS SYSTEM FOR IMPROVED WIRELESS COMMUNICATION

(71) Applicant: Alcatel Lucent, Boulogne Billancourt (FR)

(72) Inventors: Uwe Doetsch, Stuttgart (DE); Thorsten Wild, Stuttgart (DE); Andre Fonseca Dos Santos, Stuttgart (DE); Frank Schaich, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/440,471

(22) PCT Filed: Oct. 18, 2013

(86) PCT No.: PCT/EP2013/071826
§ 371 (c)(1),
(2) Date: May 4, 2015

(87) PCT Pub. No.: WO2014/067799
PCT Pub. Date: May 8, 2014

(65) Prior Publication Data
US 2015/0256249 A1    Sep. 10, 2015

(30) Foreign Application Priority Data
Nov. 5, 2012  (EP) .................................. 12306366

(51) Int. Cl.
*H04B 7/26* (2006.01)
*H04L 5/00* (2006.01)
(Continued)

(52) U.S. Cl.
CPC ......... *H04B 7/2621* (2013.01); *H04L 5/0007* (2013.01); *H04L 5/0023* (2013.01);
(Continued)

(58) Field of Classification Search
CPC ... H04B 7/2621; H04L 5/0007; H04L 5/0023; H04L 5/0035; H04W 72/0446
See application file for complete search history.

(56) References Cited

U.S. PATENT DOCUMENTS

| 7,620,095 | B2 | 11/2009 | Ben-Bassat |
| 8,831,115 | B2 * | 9/2014 | Sutivong ................ H04B 1/692 370/209 |

(Continued)

FOREIGN PATENT DOCUMENTS

| CN | 1642058 | 7/2005 |
| CN | 101151818 | 3/2008 |

(Continued)

OTHER PUBLICATIONS

Konstantinos Lizos et al., "A Novel Packet Scheduling for High Speed Bursty Traffic in LTE based-3G Concepts," Wireless Communications and Mobile Computing Conference, IEEE, pp. 671-676, XP032253379, Aug. 27, 2012.

(Continued)

*Primary Examiner* — Chi H Pham
*Assistant Examiner* — Weibin Huang
(74) *Attorney, Agent, or Firm* — Fay Sharpe, LLP

(57) ABSTRACT

Embodiments provide apparatuses, methods, and computer programs for a receiver and a transmitter of a wireless system. An apparatus (10) for a receiver (100) of a wireless communication system comprises means for receiving (12) radio signals, which are organized in repetitive radio frames, a radio frame being subdivided in sub-frames. The apparatus (10) further comprises means for extracting (14) a first (Continued)

payload data packet from the received radio signals using a single sub-frame of the received radio signals and for extracting a second payload data packet using two or more sub-frames of two or more radio frames. An apparatus (20) for a transmitter (200) comprises means for obtaining (22) information on a subset of radio resources for scheduled and/or non-scheduled transmission. The apparatus (20) further comprises means for transmitting (24) radio signals, which are organized in repetitive radio frames, a radio frame being subdivided in sub-frames, the means for transmitting (24) is operable to transmit a first payload data packet using a single sub-frame of the radio signal and for transmitting a second payload data packet using two or more sub-frames.

16 Claims, 5 Drawing Sheets

(51) Int. Cl.
*H04W 72/04* (2009.01)
*H04W 84/04* (2009.01)
(52) U.S. Cl.
CPC ....... *H04L 5/0035* (2013.01); *H04W 72/0446* (2013.01); *H04W 84/042* (2013.01)

(56) References Cited

U.S. PATENT DOCUMENTS

| | | | | |
|---|---|---|---|---|
| 2009/0109091 | A1* | 4/2009 | Thind | G01S 19/24 342/357.63 |
| 2009/0310526 | A1* | 12/2009 | Gore | H04B 7/022 370/312 |
| 2012/0014269 | A1* | 1/2012 | Ray | H04W 74/006 370/252 |
| 2012/0140760 | A1* | 6/2012 | Schmidt | H04B 1/707 370/344 |
| 2013/0208677 | A1* | 8/2013 | Lee | H04W 24/10 370/329 |
| 2014/0233460 | A1* | 8/2014 | Pettus | H04Q 1/15 370/328 |

FOREIGN PATENT DOCUMENTS

| | | | |
|---|---|---|---|
| JP | H2007-245574 | 9/1995 | |
| JP | 3142771 | 12/2000 | |
| JP | 2008-526121 | 7/2008 | |
| JP | 2009-540762 | 11/2009 | |
| JP | 2011-524691 | 9/2011 | |
| JP | 2011-254319 | 12/2011 | |
| WO | WO 2008/130161 | 10/2008 | |
| WO | WO 2010/028278 A2 | 3/2010 | |
| WO | WO 2010028278 A2 * | 3/2010 | ............. H04W 4/20 |
| WO | WO 2011/017281 | 2/2011 | |
| WO | WO 2011/018419 | 2/2011 | |
| WO | WO 2011/085403 | 7/2011 | |

OTHER PUBLICATIONS

Eunyoung Lee et al., "Packet Scheduling Scheme for Multiple Services in Mobile WiMAX System," Second International Conference on Computer and Network Technology, IEEE, pp. 60-63, XP031682385, Apr. 23, 2010.
Young-June Choi et al., "Multichannel Random Access in OFDMA Wireless Networks," IEEE Journal on Selected Areas in Communications, vol. 24, No. 3, pp. 603-613, XP011183213, Mar. 1, 2006.
International Search Report for PCT/EP2013/071826 dated Dec. 20, 2013.
"A Study on Mutual Interference between OFDM and SS in ISM band—part 2" (AO).

* cited by examiner

APPARATUSES, METHODS, AND COMPUTER PROGRAMS FOR A RECEIVER AND A TRANSMITTER OF A WIRELESS SYSTEM FOR IMPROVED WIRELESS COMMUNICATION

Embodiments relate to communication networks, more particularly but not exclusively to data transmission with diverse services in a wireless or mobile communication system.

BACKGROUND

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. The demands are growing for both directions of transmission, i.e. for the DownLink (DL), i.e. for transmission from the network infrastructure to a mobile transceiver, as well as in the UpLink (UL), i.e. in the direction from a mobile transceiver to the network infrastructure.

Conventional mobile communication systems make use of circuit switched and packet switched data. While for circuit switched data transmission radio resources are permanently reserved in a connection oriented manner, packet data transmission makes use of scheduling, i.e. radio resources are assigned non-permanently in a connection less manner. The procedure of assigning radio resources to certain users for packet data transmission is also referred to as scheduling. The entity carrying out scheduling is also called a scheduler.

At the same time data services become more and more diverse. In other words, the diversity of the Quality of Service (QoS) requirements is steadily growing. While modern mobile terminals use applications which generate background traffic, i.e. packet switched traffic of rather low amounts, which may or may not be delay sensitive, other applications such as voice and video services generate large amounts of data with high quality demands.

SUMMARY

It is a finding that future communication networks may have to deal with a broad range of services. For example, there are delay critical services such as voice and video. Moreover, there are background services, such as tickers or weather applications, email browsers, etc., which may be more delay critical but frequently generate low amounts of traffic. On top of that there are sensor applications, e.g. Machine-to-Machine (M2M) communication, for collecting data. For example, household meters are read using M2M communications. Therefore there may be a desire to support more diverse services in a communication network.

It is a further finding that there may be a desire to design a frame structure, which allows for a more efficient utilization when these diverse traffic shapes or types are transmitted. Such a frame structure may be used in mobile communication networks in both directions, i.e. in the UL when communicating from a mobile terminal to the infrastructure of the network, and in the DL, when communicating from the network infrastructure to the mobile terminal. Embodiments may therefore provide a basis for unifying the classical cellular traffic with sporadic machine-type communication and energy efficient sensor data transmission within one system and one band. Hence, embodiments may enable a more flexible and efficient communication that may be applied to future communication systems such as in 5th Generation (5G) communication systems.

As the range of service traffic shapes is growing, in embodiments, for example, three different types of traffic and devices may be distinguished. In other words, these types of traffic and devices may be supported by a ubiquitous 5G cellular system, which may be established by embodiments. One type of traffic may also be referred to as "Bitpipe", and it may correspond to a high spectrally efficient traffic with large data volumes and low latency. Another traffic type may be sporadic machine-type communication with small packet sizes, for example, caused by smart phone apps pulling for updates or providing small status information, supporting also low latency data transport. Another traffic type may be energy-efficient traffic, thus battery-saving sensor data. This data may be more tolerant to high latencies than the other ones.

Embodiments may enable a frame structure, which can handle such kinds of very different requirements or traffic types, for example, using different carrier frequency bands within the same system, for example, by using different parts of the same band to transmit different traffic types. Embodiments may therewith provide the advantage that multiple carrier frequency bands may be used within the same system instead of different systems, which may thus use different radio access networks or technologies with different frame structures. Embodiments may further provide the advantage that such a separation for different traffic types may not be utilized in different systems and therewith the fraction of unused resources may be decreased. Embodiments may therefore be more efficient and flexible than conventional systems. Embodiments may provide the advantage that different devices and traffic types may be included into one unified system. For example, very low power transmission of sensors and sporadic smart phone traffic may be integrated into a cellular network. For example, the Long Term Evolution (LTE) proposal of the $3^{rd}$ Generation Partnership Project (3GPP) may consider that machines/sensors still use the traditional Orthogonal Frequency Division Multiple Access (OFDMA) frame structure of having to support large numbers of a sporadic machine-type devices and/or applications, which may even include to further increase the number of smart phone applications (apps).

Embodiments are based on the finding that it is possible to construct a unified frame structure serving different types of traffic and devices, as, for example, the above three different types of traffic. Embodiments therefore provide an apparatus for a receiver of a wireless communication system. The apparatus can be comprised or included in the receiver of the wireless communication system. The receiver of the wireless communication system may be further comprised or included in a transceiver of the wireless communication system, such as a mobile transceiver or a base station transceiver. The apparatus will also be referred to as receiver apparatus in the following.

The apparatus may hence be part of a mobile communication system. The mobile communication system may, for example, correspond to one of the mobile communication systems standardized by the $3^{rd}$ Generation Partnership Project (3GPP), as Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms mobile communication system and mobile communication network are used synonymously.

The mobile communication system may comprise a plurality of transmission points or base station transceivers operable to communicate radio signals with a mobile transceiver. In embodiments, the mobile communication system may comprise mobile transceivers and base station transceivers. A mobile transceiver may correspond to a smartphone, a cell phone, User Equipment (UE), a laptop, a notebook, a personal computer, a Personal Digital Assistant (PDA), a Universal Serial Bus (USB)-stick, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission and reception of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc.

The mobile communication system may thus be cellular. The term cell refers to a coverage area of radio services provided by a transmission point, a remote unit, a remote head, a remote radio head, a base station transceiver or a NodeB, an eNodeB, respectively. In some embodiments a cell may correspond to a sector. For example, sectors can be achieved using sector antennas, which provide a characteristic for covering an angular section around a base station transceiver. In some embodiments, a base station transceiver may, for example, operate three or six cells covering sectors of 120° (in case of three cells), 60° (in case of six cells) respectively. A mobile transceiver can be registered or associated with a cell, i.e. it can be associated to a cell such that data can be exchanged between the network and the mobile in the coverage area of the associated cell using a dedicated channel, link or cells) respectively. A mobile transceiver can be registered or associated with a cell, i.e. it can be associated to a cell such that data can be exchanged between the network and the mobile in the coverage area of the associated cell using a dedicated channel, link or connection.

The receiver apparatus comprises means for receiving radio signals, which are organized in repetitive radio frames. A radio frame is further subdivided in sub-frames. The means for receiving can correspond to a receiver. Hence the means for receiving may be compliant to one of the above listed communication standards and it may comprise typical components of a receiver, such as one or more antennas, a Low Noise Amplifier (LNA), one or more filters, one or more mixers, one or more converters, etc. In some embodiments the means for receiving may be implemented using software being executed on accordingly adapted hardware, such as a Digital Signal Processor (DSP), a Central Processing Unit (CPU), a general purpose processor, etc. Moreover the means for receiving may be implemented using one or more devices, one or more modules, or one or more units operable to receive. In some embodiments the receiver apparatus may comprise transmitter components as well, as will be detailed subsequently. In that perspective the receiver apparatus may correspond to a transceiver apparatus.

The receiver apparatus further comprises means for extracting a first payload data packet from the received radio signal using a single sub-frame of the received radio signals and for extracting a second payload data packet using two or more sub-frames of two or more radio frames. The means for extracting may correspond to an extractor. In some embodiments the means for extracting can also be implemented as software being executed or executable on accordingly adapted hardware, such as a DSP, a CPU, a general purpose processor, etc. The means for extracting may be implemented using one or more devices, one or more modules, or one or more units operable to extract corresponding information on the respective data packets. For example, such information may be extracted from complex valued baseband data.

According to the above description the transmission is organized in radio frames, which are repeated. Within each radio frame there are a plurality of sub-frames, which are used for the individual transmissions of information on payload data packets and control data. As pointed out above, a first payload data packet, which may correspond to a scheduled transmission, is transmitted using a single sub-frame. However, at the same time, a second payload data packet can be transmitted using two or more sub-frames and two or more radio frames. In other words these two transmissions of the data packets can be superimposed.

In some embodiments the means for extracting can therefore be operable to extract the second data packet by means of de-spreading. In other words the means for extracting can be operable to perform a de-spreading operation on the received radio signals of the two or more radio frames to obtain information on the second payload data packet. In some embodiments the means for extracting can be operable to extract the first payload data packet from the received radio signals using the single sub-frame of the received radio signals while treating receive signal components comprising information on the second payload data packet as noise. This may be possible because of the spreading operation, which signal components, which are based on the second payload data packet, may be suppressed to a level, which can be considered as noise. Such suppression can be enabled by an accordingly adapted spreading gain of the spreading/de-spreading operation.

In further embodiments the receiver apparatus may further comprise means for transmitting information on a first subset of radio resources for scheduled transmission to a transmitter of the first data packet. In embodiments the means for transmitting can correspond to a transmitter, which can be compliant to one of the above listed communication systems or standards. Hence, in embodiments the means for transmitting may comprise typical components of a transmitter, such as one or more antennas, one or more Power Amplifiers (PAs), one or more converters, one or more mixers, one or more filters, one or more local oscillators, etc. In some embodiments the means for transmitting may even be implemented as software being executable on accordingly adapted hardware, such as a DSP, a CPU, etc. Moreover, the means for extracting can be operable to extract information from the first subset of radio resources from the received radio signal in the single sub-frame.

For example, the first subset of radio resources may correspond to one or more certain Physical Resource Blocks (PRBs) in an OFDM signal, information on which has been transmitted to the transmitter. In other words, the receiver may provide information on which subcarrier and time or sub-frame combination the transmitter should use to transmit such a data packet. Consequently, when the radio signals are received, only these subcarriers and time resources have to be checked for extracting the first data packet. In embodiments the means for extracting can be operable to extract information from a second subset of radio resources, which have been predetermined for a contention-based or non-scheduled transmission, from the received radio signal in the single sub-frame. In other words, not every data transmission may be scheduled. There may be non-scheduled transmissions, such as contention based transmissions, which may be especially available for small amounts of data.

Embodiments also provide an apparatus for a transmitter of a wireless communication system. The apparatus may be included or comprised in the transmitter and the transmitter may correspond to a transceiver of the wireless communication system, such as a mobile transceiver or base station transceiver. In some embodiments the transmitter may correspond to a sensor device transmitter. Again the wireless communication system may correspond to one of the above listed systems. The apparatus for the transmitter will also be referred to as transmitter apparatus in the following. The transmitter apparatus comprises means for obtaining information on a subset of radio resources for scheduled and/or non-scheduled transmission. The means for obtaining may correspond to an obtainer. The means for obtaining may correspond to software being executable on accordingly adapted hardware such as, for example, a DSP, a CPU, a general purpose processor, etc. Moreover, the transmitter apparatus comprises means for transmitting radio signals, which can be implemented as a transmitter in line with the above description. Hence the means for transmitting may comprise one or more typical transmitter components, as listed above. The means for transmitting is operable to transmit radio signals, which are organized in repetitive radio frames. A radio frame is further subdivided in sub-frames. The radio signals comprise information on a payload data packet using the subset of radio resources of a sub-frame. In other words, the transmitter apparatus is operable to receive information for scheduled and/or non-scheduled transmissions. For scheduled transmissions it is assumed that the corresponding receiver, for example a base station transceiver, provides according information on which radio resources are to be used for transmission, for example, in terms of a combination of certain subcarriers and time resources in an OFDM system such as PRBs. Such information on radio resources to be used for transmission may also be referred to as grant or scheduling grant, e.g. in 3GPP terminology. In other words, the receiver apparatus may comprise means for transmitting, which is operable to provide information on the first subset of radio resources and information on the second subset of radio resources to the transmitter.

The transmitter apparatus may comprise means for transmitting radio signals, which are organized in repetitive radio frames. The means for transmitting can be operable to transmit a first payload data packet using a single sub-frame of the radio signal and to transmit a second payload data packet using two or more sub-frames. In line with the above description the transmitter apparatus may comprise means for transmitting, which is operable to apply a spreading operation to the second payload data packet before transmitting. Hence, the transmitter may correspond to a sensor device transmitter with the capability of additionally transmitting scheduled or non-.scheduled data, or the transmitter may correspond to a mobile transceiver capable of additionally transmitting sensor-like data.

In other words different traffic types may be distinguished in embodiments. For example, a traditional UE traffic to which it is also referred to as type 1 traffic according to the above description, may be utilized. Within a multi-carrier signal a portion of the band may be configured for scheduled access, delivering type 1 traffic. The frame duration can be short in time, for example, a sub-frame may correspond to 1 ms or less, in order to provide low latency supporting fast feedback loops for channel state information reporting and Hybrid Automatic Retransmission Request (HARQ) processes. This type of traffic may correspond to traditional OFDMA LTE traffic.

Another type of traffic may be smart phone M2M similar traffic, to which it will also be referred to as type 2 traffic in the following. In this traffic type background data transmission of applications in user devices like smart phones, etc., may be carried out. Some of these transmissions may not be initialized by humans and they may consist of small packets with medium to high delay tolerance. Therefore, such transmissions may be very M2M-like but since they are to be performed by smart phones for example, the transmitted power and battery life may not be as critical as with cheap sensors. Considering that these packets are rather small and, at least to some extent, delay tolerant, random access approaches such as ALOHA, slotted ALOHA, Carrier Sensing Multiple Access (CSMA) or Ready To Send/Clear To Send (RTS/CTS) may be suitable for such transmission. Hence in embodiments a portion of the band may be configured for contention-based non-scheduled access. In this configuration transmitters may transmit the data right away, without using any random access procedure such as the LTE random access procedure, which can be considered to cause unnecessary overhead and latency due to their small packet sizes. The random access procedure in some embodiments might be synchronous, for example, slotted ALOHA. If an asynchronous access is allowed, in embodiments some filterbanks, sidelobe cancellation and/or advanced receiver techniques may be used to combat interference that is introduced by the asynchronicity.

Yet another category of traffic may be caused by rather cheap sensors or machine traffic in embodiments, to which it is also referred to type 3 traffic. Cheap machines and sensors may have strict constrains on battery life and transmission power. In some standards for such cases, long transmissions with very low power are carried out in order to save battery life, for example, the weightless standard for M2M, http://www.weightless.org. Therefore, embodiments may use another part of a frame that can or cannot be scheduled using a very low-power signal spread in time. Embodiments may use a spread spectrum technique and use frame sizes of two or more radio frames, for example, with duration of up to 1, 2 or even 5 or more seconds. In embodiments, there may be several alternatives for embedding such a frame.

One alternative can be to allocate the dedicated part of the band for such a signal. Another option in embodiments is to use superposition in the time domain. In other words, in the time domain the multi-carrier signal, containing either type 1 or type 2 data is superimposed or overlaid with a second frame with very long duration, such as 1 to 4 s or even more. This second frame or second data packet may carry a signal with spreading/repetition and/or very low code rate. The transmit power of the second payload data packet or the second signal may be very low, for example, it's power density may be 40 dB below the power density of the multi-carrier signal. In embodiments this signal may thus generate a tolerable background noise, which may be ignored by the multi-carrier receiver. The low-power and long-time stretching can be designed for sensors, which have a non-linear battery power consumption, and thus can be more energy-efficient for very low power transmissions.

In embodiments, control signaling may be utilized in order to support transmission of the according traffic. For example, a receiver, which can be implemented in a base station of a mobile communication network, may track a traffic type mix. According to a ratio of small packet sizes in conjunction with sporadic access, i.e. type 2 traffic, and traffic with larger packet sizes and larger fraction of user activity, i.e. type 1 traffic, the frequency band portions can be configured flexibly to satisfy the respective needs. In other words, at the receiver the means for receiving can be operable to receive the first data packet and the second data packet in different parts of a system bandwidth. In some embodiments, it may even receive the first data packet and the second data packet on different carriers. On the transmitter side, for example in a mobile or sensor transceiver, the transmitter may be operable to receive information on where to transmit which type of traffic and accordingly, the means for transmitting can be operable to transmit the first data packet and the second data packet in different parts of a system bandwidth, on different frequency carriers respectively.

In some embodiments, for example when small cells or heterogeneous networks are involved, the number of sporadic users might be low. For example, a very small cell such as a pico-cell, may comprise such a low number of users, such that type 2 band traffic may be skipped for those type of cells and instead they are served by the umbrella or macro-cell. The split may then be announced as part of information provided by the macro-cell in a DL broadcast channel, system information, multicast channel, etc.

In further embodiments the receiver apparatus, e.g. a base station transceiver, may comprise means for providing information on a transmission power of the means for transmitting, as such the receiver apparatus may correspond to a transceiver apparatus. Accordingly the transmitter apparatus, e.g. a mobile transceiver, may comprise means for obtaining, which is further operable to receive information on a transmission power used for transmitting radio signals from the receiver apparatus. The transmitter apparatus may then be operable to determine information on propagation delay based on the information on the transmission power and based on information on a reception power of a radio signal from the transceiver. The means for transmitting can then be operable to base a timing of a transmission within a sub-frame on the information on the propagation delay. Embodiments may therewith achieve a better synchronization than when just using a random access.

In other words, in embodiments the receiver apparatus may be located at the base station. In line with the above the base station may broadcast information on a transmit power level it is using for transmitting pilot-, reference, or broadcast data. This may allow devices, such as a mobile terminal, to estimate path loss. Type 3 traffic sensors may thus adapt their transmit power to fulfill the requirement to generate a tolerable background noise level, for example, an additional power control command can be contained in a broadcast information provided by the receiver, i.e. the base station transceiver. Type 2 traffic devices may coarsely estimate their timing offset, based on the calculated path loss. This can be used at least partly to compensate by a timing advance their level of asynchronity in an open loop manner and thus ease the work of the receiver.

In further embodiments the means for receiving at the receiver apparatus can be operable to determine a transmission indication from a predetermined subset of radio resources before receiving a payload data packet. In other words the transmitter apparatus can be operable to indicate that the transmission is carried out by using predetermined radio resources. For example, a busy tone may be transmitted on a certain frequency or using predetermined radio resources in order to indicate to the receiver, that the transmission is going to take place or is ongoing.

Moreover, in further embodiments the means for transmitting on the transmitter side can be operable to carry out a random access procedure before transmitting a payload data packet.

Embodiments further provide a method for a receiver of a wireless communication system. The method comprises receiving radio signals, which are organized in repetitive radio frames, a radio frame being subdivided in sub-frames. The method further comprises extracting a first payload data packet from the received radio signal using a single sub-frame of the received radio signal and extracting a second payload data packet using two or more sub-frames of two or more radio frames.

Embodiments further provide a method for a transmitter of a wireless communication system. The method comprises obtaining information on a subset of radio resources for a scheduled and/or non-scheduled transmission. The method further comprises transmitting radio signals, which are organized in repetitive radio frames, a radio frame being subdivided in sub-frames. The method further comprises transmitting a first payload data packet using a single sub-frame of the radio signal and transmitting a second payload data packet using two or more sub-frames.

Embodiments further provide a computer program having program code for performing one of the above described methods, when the computer program is executed on a computer or processor.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

Various embodiments will now be described in more detail with reference to the accompanying drawings. In the figures, the thicknesses of lines, layers and/or regions may be exaggerated for clarity.

Accordingly, while embodiments are capable of various modifications and alternative forms, embodiments thereof are shown by way of example in the figures and will herein be described in detail. It should be understood, however, that there is no intent to limit embodiments to the particular forms disclosed, but on the contrary, embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description some components will be displayed in multiple figures carrying the same reference signs, but may not be described multiple times in detail. A detailed description of a component may then apply to that component for all its occurrences.

Figure 1:
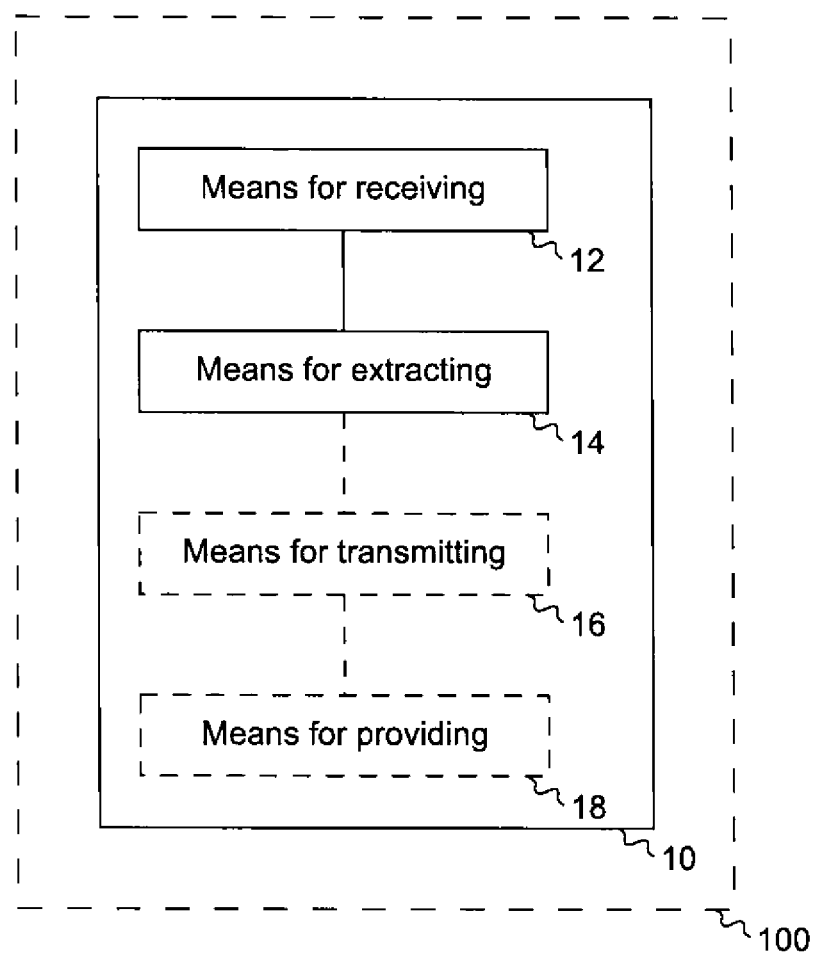
FIG. 1 illustrates an embodiment of an apparatus for a receiver.

FIG. 1 shows an embodiment of an apparatus 10 for a receiver 100 of a wireless communication system. The receiver 100 is shown in broken lines as it is optional. The embodiment of the apparatus 10 comprises means for receiving 12 radio signals, which are organized in repetitive radio frames. A radio frame is subdivided in sub-frames. As shown in FIG. 1 the receiver apparatus 10 further comprises means for extracting 14 a first payload data packet from the received radio signals using a single sub-frame of the received radio signals and for extracting a second payload data packet using two or more sub-frames of the two or more radio frames. As indicated in the figure the means for receiving 12 can be coupled with the means for extracting 14.

In the following embodiment the means for extracting 14 is operable to perform a de-spreading operation on the received radio signals of the two or more radio frames to obtain information on the second payload data packet. In some embodiments the de-spreading or de-spreading operation can happen also in the case of time-frequency superimposed type 3 traffic with type 1/2 traffic. In some embodiments the means for extracting 14 may be operable to treat underlying signals as noise, e.g. type-1/2 traffic, which can be enabled due to the spreading gain. That is to say the means for extracting 14 is operable to extract the first payload data packet from the received radio signals using the single sub-frame of the received radio signals while treating receive signal components, comprising information on the second payload data packet, as noise. Furthermore, in some embodiments prior to de-spreading, the means for extracting 14 can be operable to cancel out the impact of successfully received type-1/2 packets in the sum receive signal. In other words, once the first payload data packet has been extracted interference cancellation may be applied to the receive signal based on the extracted first payload data packet. In some embodiments this may enhance the extraction performance on the second data packet. For example, this may be done by re-encoding the first payload data packet and modeling the impact of the estimated radio channel, also known as interference cancellation, e.g. "SIC" (successive interference cancellation).

Optionally, the receiver apparatus 10 can further comprise means for transmitting 16 and/or means for providing 18, which can also be coupled to the other means. In one embodiment the receiver apparatus 10 comprises means for transmitting 16 information on a first subset of radio resources for a scheduled transmission to a transmitter 200 of the first packet. The means for extracting 14 can be operable to extract information from the first subset of radio resources from the received radio signal in the single sub-frame. Alternatively or additionally the means for extracting 14 can be operable to extract information on a second set of radio resources, which has been predetermined for contention-based non-scheduled transmission, from the received radio signal in the single sub-frame.

Figure 2:
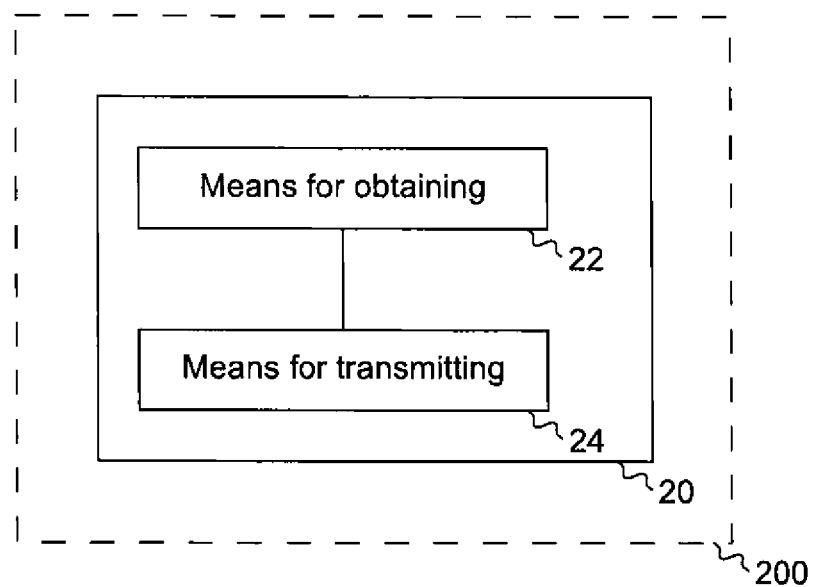
FIG. 2 illustrates an embodiment of an apparatus of a transmitter.

The means for transmitting 16 can be further operable to provide information on the first subset of radio resources and information on the second subset of radio resources to the transmitter 200. FIG. 2 illustrates an embodiment of a transmitter apparatus 20 for a transmitter 200 of the mobile communication system. The apparatus 20 comprises means for obtaining 22 information on a subset of radio resources for scheduled and/or non-scheduled transmission. Moreover, the apparatus 20 comprises means for transmitting 24 radio signals, which are organized in repetitive radio frames, a radio frame being subdivided in sub-frames. The means for transmitting 24 is operable to transmit a first payload data packet using a single sub-frame of the radio signal and for transmitting a second payload data packet using two or more sub-frames. As FIG. 2 shows the means for obtaining 22 is coupled to the means for transmitting 24. In line with the above the radio signals comprise information on a payload data packet using the subset of radio resources of a sub-frame. Moreover, the means for transmitting 24 is operable to apply a spreading operation to the second payload data packet before transmitting.

Figure 3:
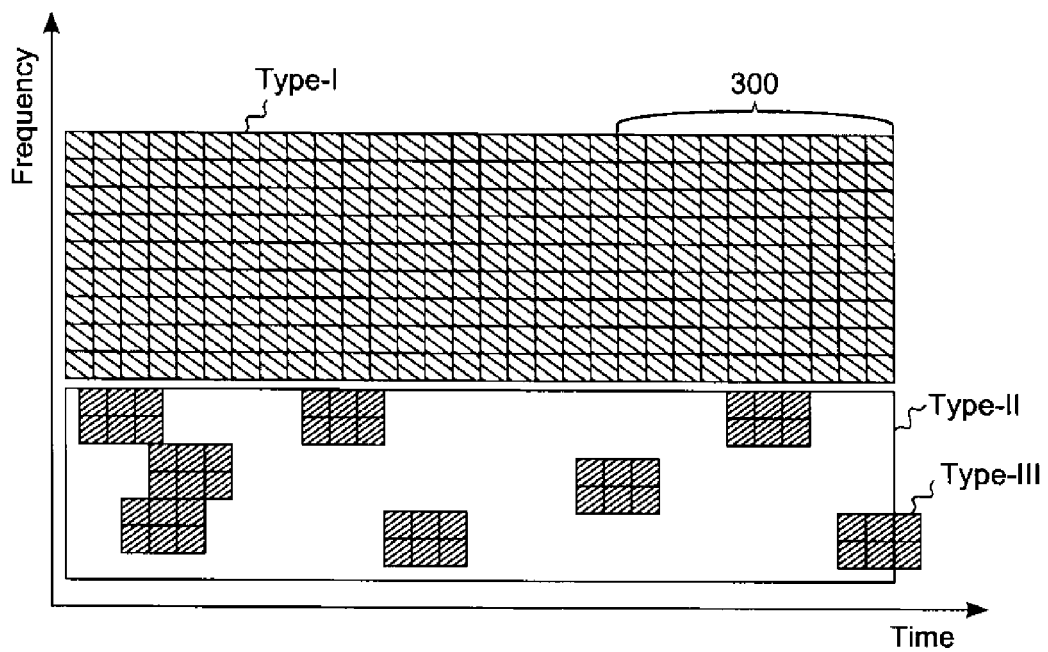
FIG. 3 illustrates a time frequency arrangement in an embodiment.

FIG. 3 shows a time-frequency arrangement in an embodiment. FIG. 3 shows the time axis to the right and the frequency axis to the top. Moreover, FIG. 3 illustrates the three types of traffic, namely type 1 (Type I), type 2 (Type II), and type 3 (Type III). Type 1 traffic may correspond to higher amounts of traffic or data packets, which are delay critical. Type 2 traffic may correspond to smaller packets which are, at least to some extent, delay critical. Type 3 traffic corresponds to traffic, which is not delay critical and which is spread over multiple radio frames. The grid shown in FIG. 3 corresponds to sub-frames, for example, 10 sub-frames may make up one radio frame, which is exemplified by the frame 300 in FIG. 3. FIG. 3 depicts the principle of an embodiment. Type 1 traffic uses traditional OFDMA access in this embodiment. Type 2 traffic and type 3 traffic superimpose on the same band their signals based on random access transmission. In other words, in this embodiment, the means for receiving 12 in the receiver apparatus 10 is operable to receive the first data packet and the second data packet in different parts of the system bandwidth. Moreover, the means for receiving 12 can be operable to receive a type 2 traffic data packet and a type 3 traffic data packet within the same bandwidth.

Correspondingly, the means for transmitting 24 on the transmitter apparatus 20 side can be operable to transmit a first data packet, which corresponds to a type 1 traffic data packet, and a second data packet, which corresponds to a type 2 or a type 3 data traffic packet, in different parts of the system bandwidth. On the other hand, the means for transmitting 24 in the transmitter apparatus 20 can be operable to transmit a type 2 traffic data packet and a type 3 traffic data packet at the same part of a system bandwidth. Moreover, the means for transmitting 24 is operable to carry out a random access procedure before transmitting a payload data packet in the present embodiment. As FIG. 3 also indicates the type 3 traffic data packet is spread in time and operates at a very low power level in such a way that it does not disturb the type 2 data packets and can still be recovered due to the time spread signal.

In order to further detail an embodiment, some example numbers are provided subsequently.

1. With time spreading and a sensor transmission bandwidth of 2 MHz, for example, a sequence of Quaternary Phase Shift Keying (QPSK) symbols is repeated 16384 times in order to obtain a spreading gain of more than 40 dB. This can provide a symbol rate of 122 symbols per second. With QPSK and the code rate of 1/3, an information bitrate of 81.4 bits/s can be obtained. Hence, in such an embodiment a typical 50 byte sensor packet can be transmitted in around 5 seconds.

2. In a spread spectrum example of an embodiment, spreading with a spreading factor of $SF=2^{14}=16384$ provides a spreading gain $3*14=42$ dB. In an embodiment using LTE-Advanced (LTE-A) sampling rate, 20 MHz transmission bandwidth is used to transmit 15.36 Megasamples/s. This results into a symbol rate of 0.9375 symbols/ms. In conjunction with QPSK and, for example, a coding rate of 1/3, 0.625 bits/ms or, for example, 1250 bits in 2 s may be transmitted, which is suitable for typical sensor traffic. In this embodiment, for the multi-carrier signal of type 1 traffic or type 2 traffic, this leads to a tolerable background noise which ranges below about −40 dB.

In a further embodiment the case where type 2 traffic and type 3 traffic are random access based and non-synchronous can be considered. The type 2 traffic data packets would then be transmitted with a preamble and a corresponding application or smart phone, i.e. transmitter, identification. In embodiments rough open loop synchronization can be carried out using DL reference signals.

A Type 3 traffic data packet can be transmitted in a long data packet with its data applying a spreading code. The allocation of codes can, in some embodiments, for example, be carried out in an easy way. For example in the above example of SF=16384 with, for example, binary pseudo-random spreading sequences the available code space is already huge, in the order of $2^{16384}$. Hence, each device or transmitter may have its own code, for example, a mapping from an Internet Protocol (IP) version 6 address or Medium Access Control (MAC) address to the spreading sequence index may be utilized. In embodiments the spreading code may be unique per transmitter. In some embodiments, when a device first enters the network, for example, via a reserved subset of spreading codes dedicated to initial/random access, an initial access procedure may be performed. Such a transmitter 200 may inform the network about its code sequence index.

In further embodiments the means for receiving 12 on the receiver apparatus 10 side can be operable to determine a transmission indication from a predetermined subset of radio resources before receiving a payload data packet. In line with this embodiment, in an embodiment of the transmitter apparatus 20 the means for transmitting 24 can be operable to accordingly transmit an indication using a predetermined subset of radio resources before transmitting a payload data packet. In embodiments, such a transmission indication may correspond to a busy tone. A busy tone signal may be used to indicate to the receiver 100 that a transmission by the transmitter 200 is about to be carried out. Namely, for example, when a type 3 device is planning to transmit a data packet it may send in a neighbor frequency a constant tone modulated by its spreading sequence. This neighbor tone can be used for activity detection at the base station side, i.e. at the receiver, such that the receiver may know the presence of a message and it may start a search for the corresponding message. Furthermore, other machines or devices may employ a carrier sensing multiple axis approach, i.e. they may listen to this frequency before they transmit in order to avoid collisions. Again, in embodiments, the sensor transmitter 200 may provide coarse synchronization based on DL reference signals and synchronization channels. In other words, they may align themselves to long slotted structure for type 3 traffic packets. Such rough synchronization may reduce complexity at the receiver 100, for example, at the base station transceiver side, as the search space of the signal is reduced.

As has been mentioned above, in embodiments the receiver apparatus 10 may further comprise means for providing 18 information on the transmission power of the means for transmitting 16, compare FIG. 1, such that the transmitter 200 can determine the propagation delay of the signal. In other words, on the transmitter apparatus 20 side, the means for obtaining 22 can be further operable to receive information on a transmission power used for transmitting radio signals from the transceiver 100. The means for obtaining 22 can be further operable to determine information on a propagation delay based on the information on the transmission power and based on information on a reception power of a radio signal from the transceiver 100. The means for transmitting 24 can then be operable to base a timing of a transmission within a sub-frame on the information on the propagation delay. Therewith, some synchronization may be achieved. In other words, the propagation delay may be considered when setting a timing advance at the transmitter apparatus 20.

In embodiments such a course timing advance and power adjustment based on a broadcasted transmit power level may be carried out. Type 2 traffic and also type 3 traffic devices or transmitters may then coarsely estimate their timing offset based on the calculated path loss obtained by the difference of indicated transmit power level and estimated receive power level of the DL signals from the receiver 100, for example, a base station transceiver. Using this, for example, with the free-space path loss formula may provide the minimum possibilities distance to the base station transceiver and thus the minimum propagation delay which can be encountered. Thus, before transmitting data, such a device may listen to the DL synchronization, reference and/or broadcast channels, it may synchronize itself, and it may estimate the minimum possible or even the average propagation delay and takes this into account by transmitting earlier to achieve a course time-alignment of the receive signals at the receiver 100.

In further embodiments the type 3 traffic may use a faction of the entire bandwidth, for example, 2 MHz as an example of the above embodiment, together with frequency hopping on the band of the type 2 traffic. Optionally, frequency hopping on both bands i.e. type 1 traffic band and the type 2 traffic band may be used. In further embodiments an announcement of type 3 traffic data transmissions may be carried out on the resources reserved for type 2 traffic data communications. This may reduce a search complexity at the receiver, for example, at the base station. In such an approach a sensor transmitter 200 may be able to transmit within a type 3 and/or type 2 traffic architecture.

In further embodiments type 2 and type 3 traffic may be scheduled instead of being transmitted in a contention-based way. In such embodiments these traffic types may maintain the above characteristics, i.e. they may be superimposed, type 2 traffic data packets with short packages and type 3 traffic data packets are spread in time. Nevertheless, in such embodiments the signals can be scheduled by the base station, i.e. by the receiver 100. In this case a DL control channel for type 3 traffic data packets may be defined for transmitting scheduling grants. These can be implemented by a signal within the same band, which may also be spread in time and with predefined recurrent time slots or sub-frames. Such embodiments may make use of synchronized signals.

In further embodiments type 2 and type 3 traffic data packets may use different frequencies, i.e. they may be neighbors in the frequency domain. In such embodiments type 2 and type 3 traffic data packets may be overlapped in time, but use different frequencies. If asynchronicity is allowed, filterbank techniques, sidelobe cancellation, and/or advanced receiver techniques can be used to battle interference.

In yet another embodiment type 3 traffic data packets are superimposed on the joined bandwidth of type 1 and type 2 traffic, for example, using a spread spectrum transmission.

Figure 4:
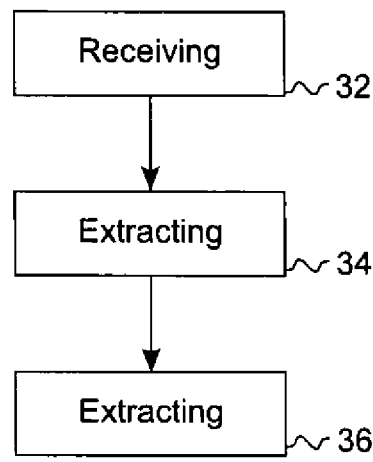
FIG. 4 shows a block diagram of an embodiment of a method for a receiver.

FIG. 4 illustrates a block diagram of an embodiment of a method for a receiver 100 of a wireless communication system. The method comprises a step of receiving 32 radio signals, which are organized in repetitive radio frames, a radio frame being subdivided in sub-frames. The method further comprises a step of extracting 34 a first payload data packet from the received radio signal using a single sub-frame of the received radio signal. The method further comprises a step of extracting 36 a second payload data packet using two or more sub-frames of two or more radio frames.

Figure 5:
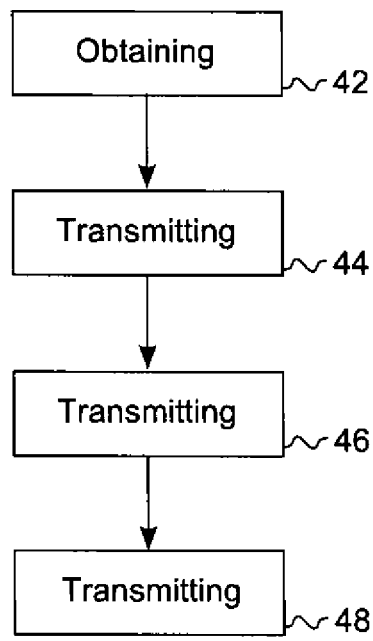
FIG. 5 shows a block diagram of an embodiment of a method for a transmitter.

FIG. 5 illustrates a block diagram of an embodiment of a method for a transmitter 200 of a wireless communication system. The method comprises a step of obtaining 42 information on a subset radio resources for scheduled and/or non-scheduled transmission and a step of transmitting 44 radio signals, which are organized in repetitive radio frames, a radio frame being subdivided in sub-frames. The method further comprises as a step of transmitting 46 a first payload data packet using a single sub-frame of the radio signal and a step of transmitting 48 the second payload data packet using two or more sub-frames.

Embodiments further provide a computer program having a program code for performing one of the above described methods, when the computer program is executed on a computer or processor.

Embodiments of the present invention may allow for unifying a cellular communication network with sensor communication. Scarce radio resources may be saved using embodiments by avoiding unused fractions with would occur in systems applying split bands or even worse in case of separate systems. Embodiments may be able to semi-statically distribute the available spectrum to the respective traffic types depending on the number of nodes, respectively. Embodiments may provide high spectrally efficient traffic combined within the same bandwidth with sporadic small packet traffic and battery-efficient sensor traffic in a ubiquitous, flexibly configurable, improved or even optimal way. Moreover, embodiments may enable next generation systems with the help of the frame structure provided. Embodiments may be able to offer a broad additional support for new device classes and traffic types, even when a new air interface is introduced.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transmitting", "means for receiving", "means for extracting", "means for obtaining", "means for providing", etc., may be provided through the use of dedicated hardware, such as "a transmitter", "a receiver", "an extractor", "an obtainer", "a provider", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for a receiver of a wireless communication system, the apparatus comprising:
   a receiver operable to receive radio signals, which are organized in repetitive radio frames, a radio frame being subdivided in sub-frames; and
   an extractor operable to extract a first payload data packet from the received radio signals using a single sub-frame of the received radio signals and to extract a second payload data packet using two or more sub-frames of two or more radio frames, wherein the extractor is operable to perform a de-spreading operation on the received radio signals of the two or more radio frames to obtain information on the second payload data packed,
   wherein the extractor is operable to extract the first payload data packet from the received radio signals using the single sub-frame of the received radio signals while treating receive signal components comprising information on the second payload data packet as noise.

2. The apparatus of claim 1, further comprising a transmitter operable to transmit information on a first subset of radio resources for scheduled transmission to a transmitter of the first payload data packet, and wherein the extractor is operable to extract information from the first subset of radio resources from the received radio signal in the single sub-frame, or
   wherein the extractor is operable to extract information from a second subset of radio resources, which have been predetermined for contention-based non-scheduled transmission, from the received radio signal in the single sub-frame.

3. The apparatus of claim 2, wherein the transmitter is operable to provide information on the first subset of radio resources and information on the second subset of radio resources to the transmitter.

4. The apparatus of claim 1, wherein the receiver is operable to receive the first payload data packet and the second payload data packet in different parts of a system bandwidth.

5. The apparatus of claim 1, further comprising a provider operable to provide information on a transmission power of the transmitter.

6. The apparatus of claim 1, wherein the receiver is operable to determine a transmission indication from a predetermined subset of radio resources before receiving a payload data packet.

7. The apparatus of claim 1, wherein the extractor is further operable to apply interference cancellation to the received radio signals based on the extracted first payload data packet.

8. An apparatus for a transmitter of a wireless communication system, the apparatus comprising:
   an obtainer operable to obtain information on a subset of radio resources for scheduled and/or non-scheduled transmission; and
   a transmitter operable to transmit radio signals, which are organized in repetitive radio frames, a radio frame being subdivided in sub-frames, wherein the transmitter is operable to transmit a first payload data packet using a single sub-frame of the radio signal and wherein the transmitter is operable to transmit a second payload data packet using two or more sub-frames, wherein the transmitter is operable to apply a spreading operation using a spread spectrum technique to the second payload data packet before transmitting,
   wherein the transmitter is operable to apply the spreading operation to suppress radio signal components comprising information on the second payload data packet to a level enabling treatment of the radio signal components as noise.

9. The apparatus of claim 8, wherein the obtainer is further operable to receive information on a transmission power used for transmitting radio signals from a transceiver and to determine information on a propagation delay based on the information on the transmission power and based on information on a reception power of a radio signal from the transceiver, and wherein the transmitter is operable to base a timing of a transmission within a sub-frame on the information on the propagation delay.

10. The apparatus of claim 8, wherein the radio signals comprise information on a payload data packet using the subset of radio resources of a sub-frame.

11. The apparatus of claim 8, wherein the transmitter is operable to carry out a random access procedure before transmitting a payload data packet.

12. A method for a receiver of a wireless communication system, the method comprising
   receiving radio signals, which are organized in repetitive radio frames, a radio frame being subdivided in sub-frames;
   extracting a first payload data packet from the received radio signal using a single sub-frame of the received radio signal; and
   extracting a second payload data packet using two or more sub-frames of two or more radio frames, wherein the extracting comprises performing a de-spreading operation on the received radio signals of the two or more radio frames to obtain information on the second payload data packet, wherein extracting the first payload data packet comprises extracting the first payload data packet from the received radio signals using the single sub-frame of the received radio signals while treating the received radio signal components comprising information on the second payload data packet as noise.

13. The method of claim 12, wherein said extracting comprises applying interference cancellation to the received radio signals based on the extracted first payload data packet.

14. A method for a transmitter of a wireless communication system, the method comprising,
   obtaining information on a subset of radio resources for scheduled and/or non-scheduled transmission;
   transmitting radio signals, which are organized in repetitive radio frames, a radio frame being subdivided in sub-frames;
   transmitting a first payload data packet using a single sub-frame of the radio signal; and
   transmitting a second payload data packet using two or more sub-frames, wherein the transmitting comprises applying a spreading operation using a spread spectrum technique to the second payload data packet before transmitting, wherein applying the spreading operation comprises suppressing radio signal components comprising information on the second payload data packet to a level enabling treatment of said radio signal components as noise.

15. A non-transitory computer-readable storage medium in which a program is saved, the program comprising instructions which, when executed, prompt a computer or processor to:
   receive radio signals, which are organized in repetitive radio frames, a radio frame being subdivided in sub-frames;
   extract a first payload data packet from the received radio signal using a single sub-frame of the received radio signal; and
   extract a second payload data packet using two or more sub-frames of two or more radio frames, wherein the extracting comprises performing a de-spreading operation on the received radio signals of the two or more radio frames to obtain information on the second payload data packet, wherein extracting the first payload data packet comprises extracting the first payload data packet from the received radio signals using the single sub-frame of the received radio signals while treating the received radio signal components comprising information on the second payload data packet as noise.

16. A non-transitory computer-readable storage medium in which a program is saved, the program comprising instructions which, when executed, prompt a computer or processor to:
   obtain information on a subset of radio resources for scheduled and/or non-scheduled transmission;
   transmit radio signals, which are organized in repetitive radio frames, a radio frame being subdivided in sub-frames;
   transmit a first payload data packet using a single sub-frame of the radio signal; and
   transmit a second payload data packet using two or more sub-frames, wherein the transmitting comprises applying a spreading operation using a spread spectrum technique to the second payload data packet before transmitting, wherein applying the spreading operation comprises suppressing radio signal components comprising information on the second payload data packet to a level enabling treatment of said radio signal components as noise.

* * * * *